P. H. CHASE.
WEED HOOK.
APPLICATION FILED NOV. 15, 1911.
1,036,191.  
Patented Aug. 20, 1912.
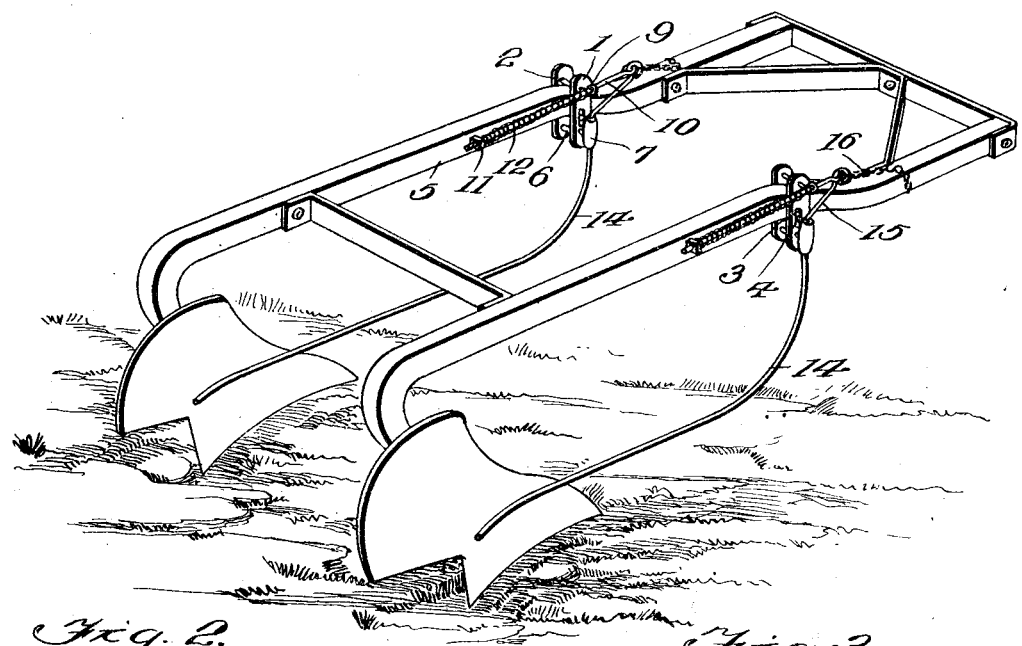
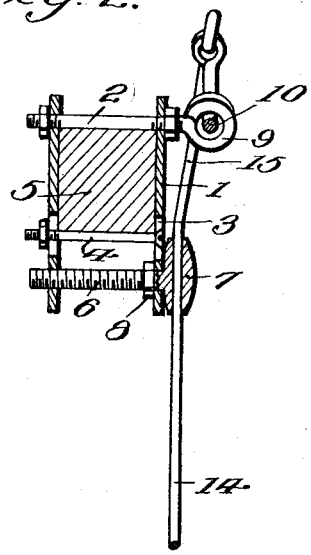
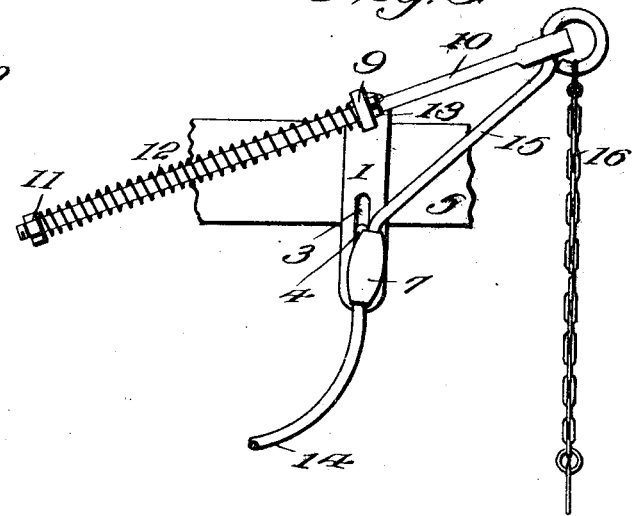
Witnesses  
Edward P. Rea  
Juang M. Fallin
Inventor  
P. H. Chase.
By A. B. Stacey, Attorney

UNITED STATES PATENT OFFICE.

PHILO H. CHASE, OF ECKMAN, NORTH DAKOTA.

WEED-HOOK.

1,036,191.  Specification of Letters Patent.  Patented Aug. 20, 1912.

Application filed November 15, 1911. Serial No. 660,524.

*To all whom it may concern:*

Be it known that I, PHILO H. CHASE, citizen of the United States, residing at Eckman, in the county of Bottineau and State of North Dakota, have invented certain new and useful Improvements in Weed-Hooks, of which the following is a specification.

This invention has relation to weed hooks adapted to be attached to plow beams, and has for its object to provide a hook of simple structure supported in a peculiar manner so that it will have proper bearing against the upper surface of a furrow slice as it is being turned for the purpose of causing the said slice to completely cover the weeds or vegetable growth after the slice is turned.

For a full understanding of the invention reference is to be had to the following description and accompanying drawing in which:

Figure 1 is a perspective view of gang plows showing weed hooks applied to the beams thereof; Fig. 2 is a transverse sectional view through one of the plow beams and parts of the weed hook; and Fig. 3 is a side elevation of parts of the weed hook.

Corresponding and like parts are referred to in the following description and indicated in all the views of the accompanying drawing by the same reference characters.

The structure includes a clamp which is made up of side plates 1 which are secured together at their upper ends by a bolt 2. The plates are provided with slots 3 through which a bolt 4 passes. The bolt 4 may be adjusted along the slots 3 so as to fit snugly against the under side of the plow beam 5. The bolt 2 rests upon the upper edge of the said beam. A bolt 6 is pivotally mounted in the lower ends of the plates 1 and is provided at one end with a sleeve 7. The sleeve 7 is disposed approximately at a right angle to the long dimension of the bolt 6. A nut 8 is screw threaded upon the intermediate portion of the bolt 6 and is located between the plates 1 and bears against the inner face of one of the plates and restrains the bolt 6 against longitudinal movement. The bolt 2 is provided at one end with an eye 9. A rod 10 passes through the eye 9 and is slidably mounted therein. An abutment nut 11 is screw threaded upon the rear end of the rod 10 and a coiled spring 12 surrounds the said rod and is interposed between the nut 11 and the adjacent side of the eye 9. The spring 12 is under tension with a tendency to hold the rod 10 toward the rear in the eye 9. An abutment collar 13 is adjustably mounted upon the forward portion of the rod 10 and bears against the forward side of the eye 9 and limits the rearward movement of the rod 10 in the eye 9 in response to the tension of the spring 12. A hook 14 is slidably mounted in the sleeve 7 and is provided with an upwardly and forwardly disposed end portion 15. The upper end of the portion 15 is pivotally connected with the forward end of the rod 10. Below the collar 13 the hook 14 is downwardly, rearwardly and outwardly disposed so that the rear portion of the said hook will bear upon a furrow slice just in advance of the plow bottom. A chain 16 is connected at one end with the forward portion 15 of the hook 14 and the other end of the said chain is attached around the plow beam or any other part of the plow so that the said chain limits the upward movement of the upper portion of the hook 14 and prevents the lower portion of the hook from crowding too tight or close against the upper surface of the furrow slice, when it encounters weeds.

As the plow moves along the ground the lower portion of the hook 14 strikes the weeds upon the furrow slice and as the said slice is turned the hook will fold the weeds under the same so that they will be completely covered by the soil. As the lower portion of the hook 14 passes over irregularities at the surface of the furrow slice the said hook may have slight sliding movement in the sleeve 7 and also the said sleeve may turn on the bolt 6 as an axis. This movement on the part of the hook will have a tendency to compress the spring 12 so that when the hook has passed over the irregularities the tension of the said spring will come into play and force the parts back to their normal positions. As the hook moves in an upward direction through the sleeve 7 the rod 10 will swing so that the eye 9 and the bolt 2 are turned. When the hook moves in a downward direction through the sleeve, the said spring will cause the eye and the rod to move back to their normal positions. The slots 3 in the plates 1 are provided in order that the clamp plates may be applied to beams of different vertical breadths. Therefore it will be seen that a weed hook of simple structure is provided which will effectually fold the weeds and which is resiliently held in proper position against its work.

Having thus described the invention, what is claimed as new is:

1. A weed hook comprising a clamp, a sleeve pivoted thereon, a hook slidably mounted in the sleeve, an eye carried by the clamp, a rod slidably passing through the eye and pivotally connected with the upper portion of the hook, and a spring bearing against the rod to hold the same in a normal position in the eye.

2. A weed hook comprising a clamp, a sleeve pivoted thereon, a hook slidably mounted in the sleeve, an eye carried by the clamp, a rod slidably passing through the eye and pivotally connected with the forward portion of the hook, an abutment adjustably mounted upon the rod, and a spring interposed between the abutment and the eye.

3. A weed hook comprising a clamp, a sleeve pivotally mounted thereon, a hook slidably mounted in the sleeve, an eye carried by the clamp, a rod slidably passing through the eye and pivotally connected with the hook, an abutment mounted upon the rod, a spring interposed between the abutment and the eye, and a second abutment mounted upon the rod between the point of attachment of the rod with the hook and the eye.

4. A weed hook comprising a clamp, a sleeve pivoted thereon, a hook slidably mounted in the sleeve and having a forwardly disposed upper portion, a chain connected with the forward end of the upper portion, an eye carried by the clamp, a rod slidably passing through the eye, a spring bearing upon the rod and tending to hold the same in a rearward position in the eye, and means mounted upon the rod for limiting its rearward movement through the eye.

5. A weed hook comprising plates, a bolt connecting the upper ends of the plates together, said plates having elongated slots, a bolt adjustably mounted in said slots, a sleeve pivoted to the lower portions of the plates, a hook slidably mounted in the sleeve, an eye mounted upon the first mentioned bolt, a rod slidably passing through the eye, a spring engaging the rod and tending to hold the same in a rearward position, and an abutment mounted upon the rod and adapted to engage the eye to limit the rearward movement of the rod.

In testimony whereof I affix my signature in presence of two witnesses.

PHILO H. CHASE. [L. S.]

Witnesses:
RICHARD M. FRANZEN,
JOSEPH MCCANN.